July 16, 1963
O. J. POUPITCH
3,097,740
CONTAINER CARRIER PACK AND METHOD OF MAKING SAME
Filed Oct. 21, 1960
3 Sheets-Sheet 1
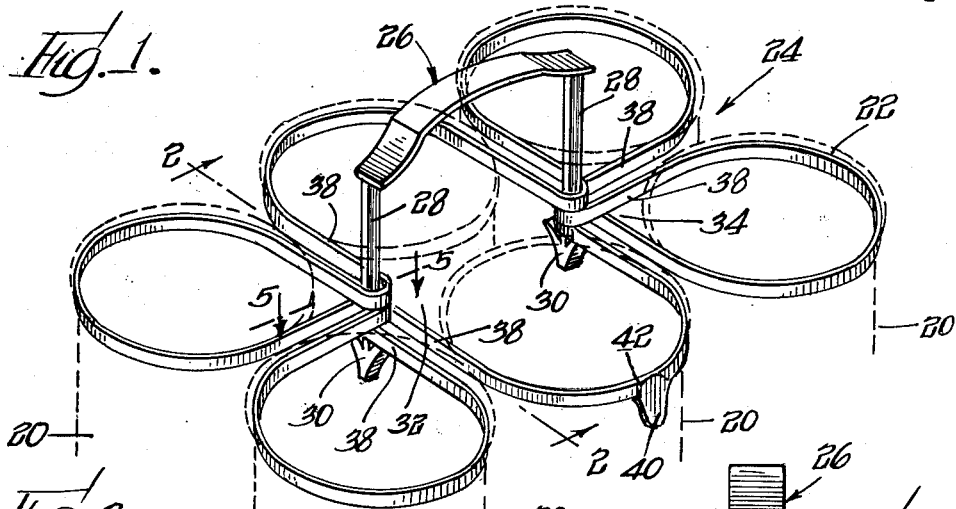
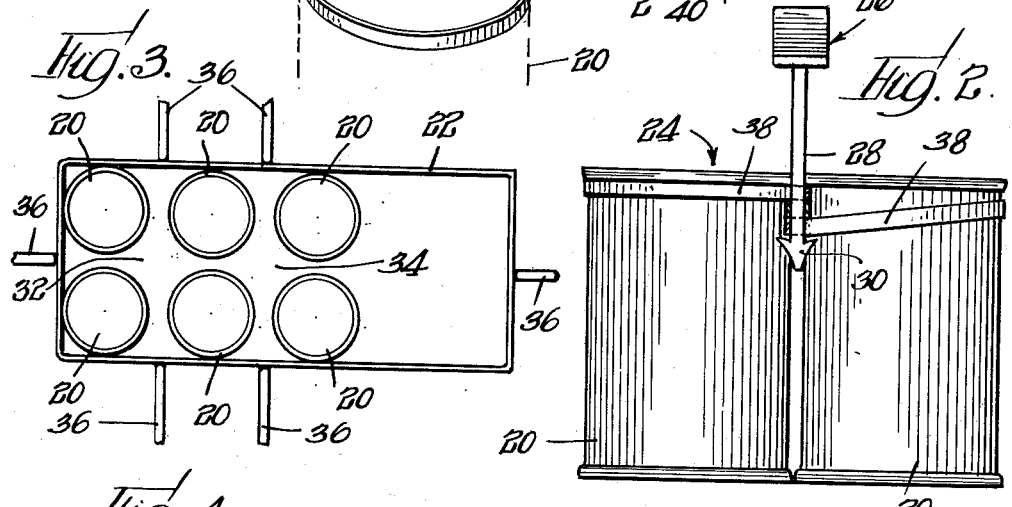
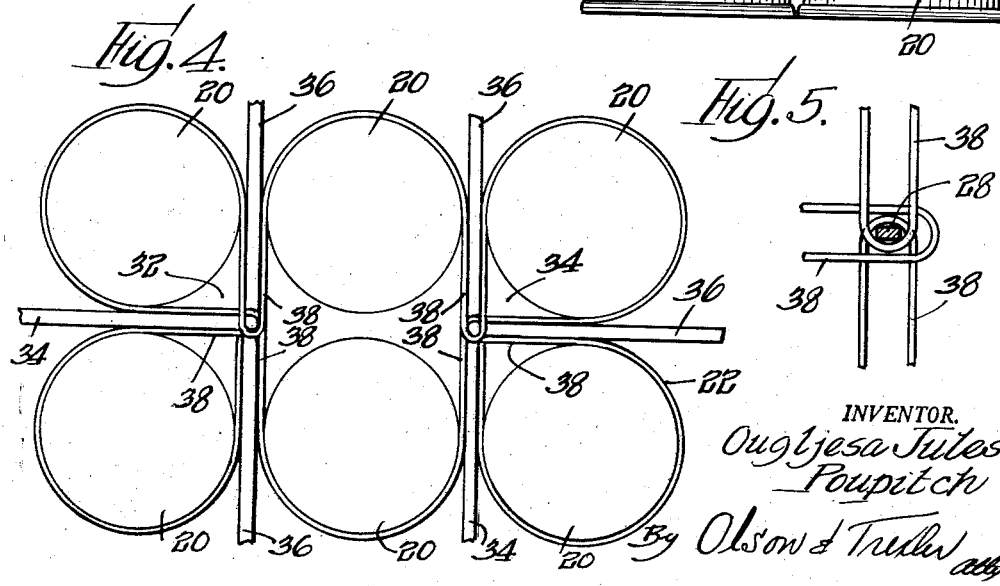
INVENTOR.
Ougljesa Jules
Poupitch
By Olson & Trexler
attys

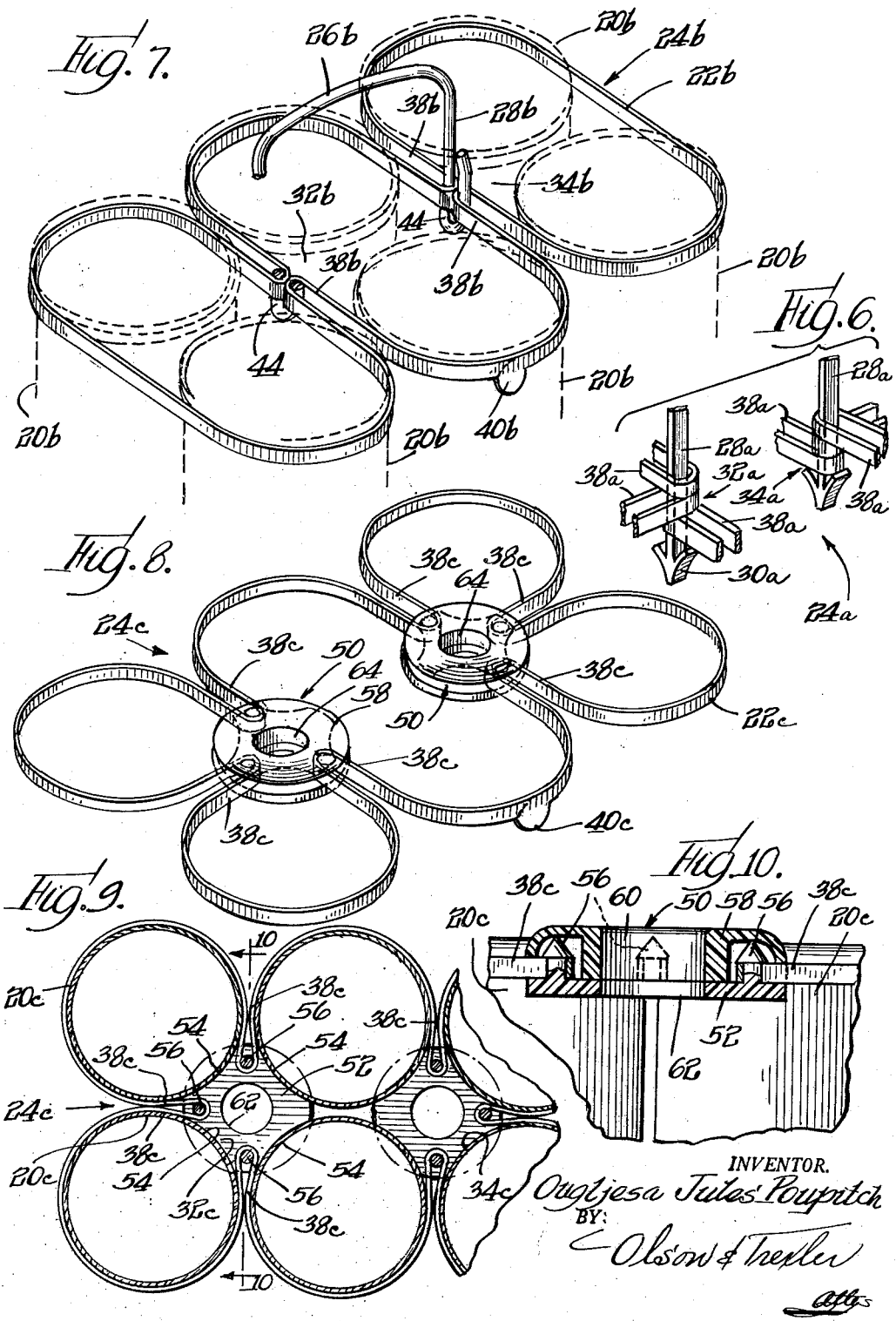

July 16, 1963 — O. J. POUPITCH — 3,097,740
CONTAINER CARRIER PACK AND METHOD OF MAKING SAME
Filed Oct. 21, 1960 — 3 Sheets-Sheet 3
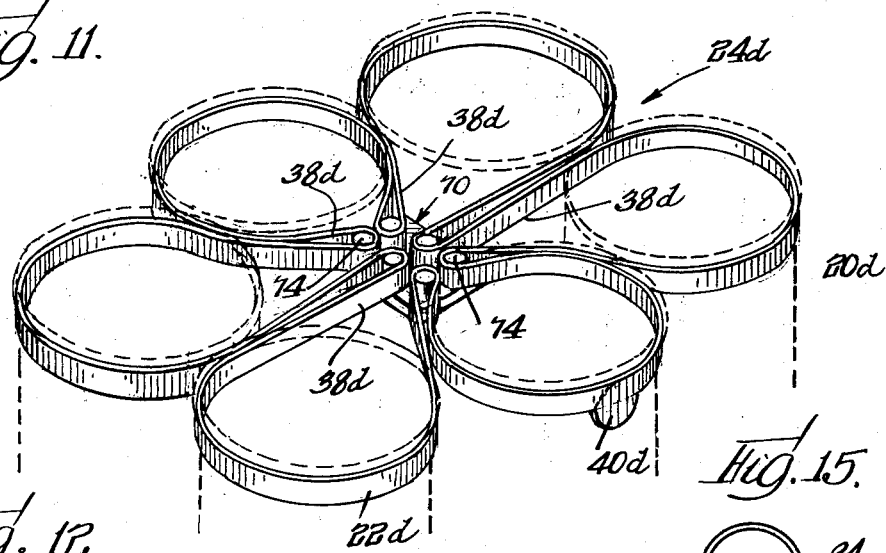
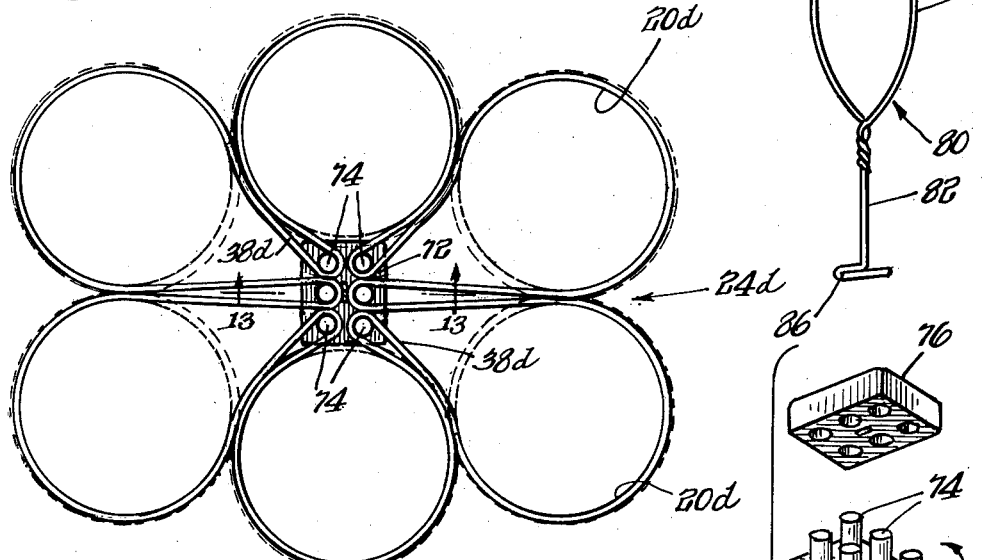
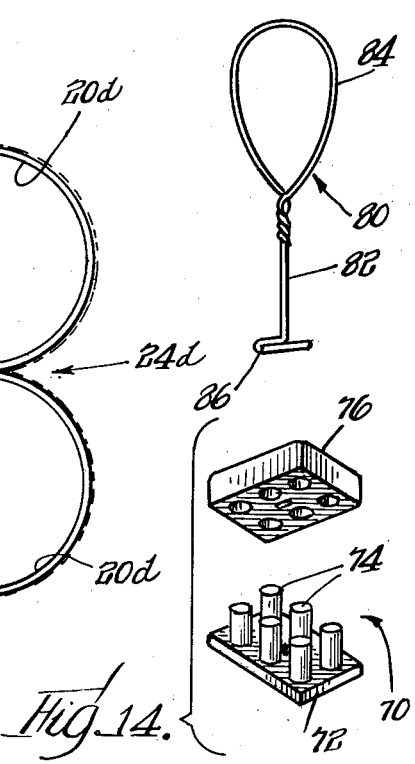
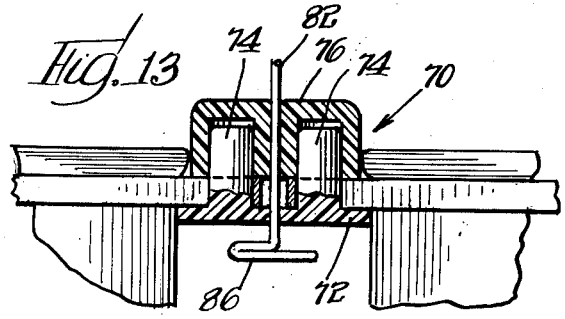
INVENTOR.
Ougljesa Jules Poupitch
BY Olson & Trexler
attys.

United States Patent Office 3,097,740
Patented July 16, 1963

3,097,740
CONTAINER CARRIER PACK AND METHOD
OF MAKING SAME
Ougljesa Jules Poupitch, Itasca, Ill., assignor to Illinois
Tool Works Inc., a corporation of Delaware
Filed Oct. 21, 1960, Ser. No. 64,140
21 Claims. (Cl. 206—65)

The present invention relates to carrier packs of containers adapted for convenient handling and retailing of beverages and other products contained in bottles, cylindrical cans, or other containers of a similar character.

The very material advantages which can be realized from assembling containers together in carrier packs for handling and retailing are well known and have led to the development of a wide variety of means and methods of assembling clusters of containers into packs for carrying. Many of these have been used successfully and afford many advantages. Nevertheless, the methods and means previously used in forming such carrier packs are individually marked by their own characteristics and limitations, and in some instances by decided shortcomings and disadvantages. For example, some carrier packs have greatly restricted thermal exposure of the containers to the external environment. Some packs will not stand up when wet. Invariably, there are limitations on the degree to which the cost of forming or producing the packs can be reduced.

One object of the invention is to provide new and improved means and method of assembling containers into carrier packs which afford great economy in the production of the carrier packs, while at the same time producing novel carrier packs which provide many advantages to the user.

Another object is to provide an improved carrier pack of containers in which containers are bound together and supported for carrying by means of a single endless retaining band aided only by simple anchoring structure for the band.

Another object is to provide an improved carrier pack of containers in which simple hand-grip means, together with an endless stretchable band, provide a supporting grip on each of a plurality of containers arranged in a plurality of rows, the grip on each containers encompassing the major portion of the periphery of the container.

Another object is to provide an improved carrier pack of containers in which a cluster of containers arranged in a plurality of adjacent rows are held in snug mutual engagement and supported for carrying by means of a simple handle and a simple retaining band coacting with the handle and the individual containers.

Other objects and advantages will become apparent from the following description of the exemplary embodiments of the invention illustrated in the drawings, in which:

FIGURE 1 is a perspective view showing the upper portion of a carrier pack of containers embodying the invention, the individual containers being shown in phantom lines for clearness in illustration;

FIG. 2 is a transverse sectional view of the carrier pack, taken with reference to the line 2—2 of FIG. 1;

FIG. 3 is a plan view illustrating one step in the formation of the carrier pack illustrated in FIGS. 1 and 2;

FIG. 4 is a plan view illustrating another step in the formation of the carrier pack of FIGS. 1 and 2;

FIG. 5 is a fragmentary sectional view, taken with reference to the line 5—5 of FIG. 1;

FIG. 6 is a fragmentary perspective view illustrating a relationship of the handle to the inner loops of the retaining band which can be used as an alternative of the relationship of these parts illustrated in FIG. 1;

FIG. 7 is a perspective view illustrating the upper end of a container pack forming another embodiment of the invention, the containers being shown in phantom for clearness in illustration;

FIG. 8 is a perspective view of container binding or holding components of another embodiment of the invention, the containers being left out of this figure for clearness in illustration;

FIG. 9 is a horizontal sectional view of a container pack in which the containers are bound together by the structure illustrated in perspective in FIG. 8;

FIG. 10 is a fragmentary sectional view taken with reference to the line 10—10 of FIG. 9;

FIG. 11 is a perspective view showing the upper end of a container pack forming another embodiment of the invention, the containers being illustrated in phantom and the cover for the loop anchoring means and the handle being removed for clearness in illustration;

FIG. 12 is a horizontal sectional view of the container pack structure illustrated in perspective in FIG. 11, the containers being shown in phantom for clearness in illustration;

FIG. 13 is a fragmentary sectional view, taken with reference to the line 13—13 of FIG. 12;

FIG. 14 is an exploded perspective view of loop anchoring means used in the embodiment shown in FIGS. 11 and 12; and FIG. 15 is an elevational view of the handle for the carrier pack which is mounted in association with the loop anchoring means, as shown in FIG. 13.

One exemplary embodiment of the invention and the method by which it is formed in accordance with the invention are illustrated in FIGS. 1 to 5. As shown, six cylindrical containers or cans 20 of the character commonly used to contain food and beverages, are positioned together, as shown in FIG. 3, to form a cluster comprising two juxtaposed rows of three containers each.

All six of the containers 20 in the cluster are effectively bound together in a convenient carrier pack by means of a single endless retaining band 22 and simple anchoring means interlocked with the retaining band, and adapted to form a convenient hand grip for supporting the carrier pack. The container carrier pack formed by the invention and illustrated in FIGS. 1 and 2 is identified generally by the number 24.

In the carrier pack 24, the anchoring means, which locks the retaining hand 22 in closely embracing relation to each of the containers 20, is formed by a U-shaped plastic handle 26 having two generally parallel downwardly extending legs 28. The legs are caused to interlock with loops formed in the band 22, as will presently appear. The lower ends of the handle legs 28 terminate in arrow-shaped anchors 30 designed to hold the handle legs in interlocked relation to the retaining band and aid in transmitting lifting force from the handle to the band when the carrier pack 24 is carried by the handle, as will presently appear.

The endless retaining band 22 is formed from a tough, resinous plastic material which is characterized by being stretchable in films of reasonable thickness. The band 22 is formed with an initial peripheral length which is somewhat less than the length to which the band is stretched upon assembling the band into a carrier pack 24.

Assembly of the retaining band 22 and the handle 26 with a cluster of containers 20, in accordance with the invention, to form a carrier pack 24 is a very simple matter. Six containers to be assembled together in a pack 24 are placed in a loose two-row cluster, as illustrated in FIG. 3. An endless retaining band 22 is placed in encircling relation to the upper end of the cluster of containers 20, as illustrated in FIG. 3. As shown, the band 22 has a peripheral length exceeding the length of the outer periphery of the cluster in which the cans are to be bound together in the pack 24.

Thus, the band 22 is constructed to have sufficient length to form a plurality of inner loops, to be described, which extend horizontally inward between adjacent cans 20 in the cluster.

Looking now to FIGS. 1 and 4, it will be observed that the six containers 20 of the cluster, upon being drawn together define two relatively large interstices 32, 34, spaced apart longitudinally with reference to the elongated cluster and individually bounded by four containers or cans of the cluster. These interstices are also identified in the loose cluster illustrated in FIG. 3.

The band 22 positioned in encircling relation to a cluster of containers, as illustrated in FIG. 3, is engaged by six pusher elements 36 spaced around the cluster as shown in FIG. 3, so that the pusher elements are positioned to move horizontally inward between successive cans defining the periphery of the cluster.

The pusher elements 36 are simultaneously moved horizontally inward into the position illustrated in FIG. 4. Each pusher element 36, upon moving horizontally inward between two adjacent ends of the cluster, as shown, carries the adjacent portion of the band 22 inward to form an inner loop 38 in the band and extend this inner loop into the adjacent one of the interstices 32, 34. It may be noted here that while FIG. 3 shows the band 22 located in an off-center position in relation to the cluster of containers 20 when initially placed in encircling relation to the cluster, this is for the purpose of illustrating the excessive length of the band in relation to the outer periphery of the cluster. In actual practice, the band 22 is initially centered with respect to the cluster so that the length of the band is more evenly distributed around the cluster.

Further with reference to FIG. 4, it will be noted that three of the pusher elements 36 move into the interstice 32 to form inner band loops 38 having inner ends which are carried into mutually overlapping relation to each other, as illustrated in FIGS. 1, 2, 4 and 5. Similarly, three pusher elements 36 enter the interstices 34 to form three loops 38 which overlap each other in the interstices 34, as shown.

The depending legs 28 of the U-shaped handle or bail 26 are extended downwardly into the respective interstices 32, 34, so that each leg 28 extends down through the inner ends of the three loops 38 which overlap each other in the interstices receiving the legs. The anchor 24 on the lower end of each leg 28 extends below the loops 38 receiving the leg where the enlarged anchor serves to preclude retraction of the anchor from its interlocked relation to the coacting loops.

In this manner, the handle 26, itself, is caused to serve as an anchor which holds the inner band loops 38 against retraction from between the containers 20.

As previously intimated, the band 22 is stretched somewhat in the formation of the inner loops 38 which extend inwardly between adjacent containers of the cluster. The effect of this is to draw the band tight around each individual container of the cluster. This tensioning of the band 22, together with the fact that the formation of the loops between the adjacent cans causes a direct engagement of the band with the major portion of the periphery of each container, produces an effective binding action of the band on each container which holds the can firmly in the cluster, and provides a dependable means of lifting the individual cans of the cluster in unison by lifting force applied to the handle 26. The extensiveness of the gripping engagement of the band 22 with each container 20 provides assurance against dislodgement of the container from the container carrier pack thus formed during subsequent handling of the pack.

Disassembly of the carrier pack 24 to release the containers 20 is facilitated by the release tab 40 integrally formed on a portion of the retaining band 22 adjacent a series of perforations 42 formed on the band and extending transversely across the band, as shown in FIG. 1. Manual force applied to the tab 40 will rip the band 22 along the line of perforations 42. This breaks the band to release all the containers.

A slight modification of the carrier pack 24, described in relation to FIG. 1, is illustrated in FIG. 6 in which carrier pack components similar to those in the carrier of FIG. 1 are identified with the same reference numbers with the addition of the suffix "a." The carrier pack 24a, FIG. 6, differs from the carrier 24 of FIG. 1 in the relationship of the overlapping inner band loops in the two interstices of the container cluster. In the carrier pack of FIG. 1, the two inner band loops 38 which extend into the interstices 32, 34 from one longitudinal side of the cluster overlap and lie above the opposed inner band loops 38 which extend into the interstices from the opposite longitudinal side of the cluster. In the modified carrier pack 24a of FIG. 6, the two band loops 38a extending into the interstices 32a and 34a from one longitudinal side of the container cluster, respectively, overlie and underlie the opposed band loops 38a which extend into the interstices from the opposite longitudinal sides of the cluster, thus providing a torsional balance of the forces applied to the handle 26 by the band loops.

Component elements of the carrier pack forming the modified embodiment of the invention illustrated in FIG. 7 which are similar to the embodiment illustrated in FIG. 1 are identified by the same reference numbers with the addition of the suffix "b."

In the carrier pack 24b of FIG. 7, only four inner loops 38b are formed in the retaining band 22b, two loops extending into the respective interstices 32b, 34b from each longitudinal side of the container cluster. The two loops extending into each of the interstices are anchored together by the lower end of the corresponding leg 28b of the handle 26b.

In this instance, the handle or bail 26b is formed of metal. The lower end of each handle leg 28b is bent back on itself to form an eye 44 which receives and anchors the inner ends of the adjacent loops 38b, as shown in FIG. 7.

Component elements of the modified container pack structure illustrated in FIGS. 8 to 10, which are similar to components of the pack structure illustrated in FIG. 1, are identified by the same reference numbers, with the addition of the suffix "c."

In the structure of the carrier pack 24c illustrated in FIGS. 8 to 10, three inner retaining band loops 38c extend into each of the interstices 32c and 34c. The three loops extending into each of the interstices are anchored against retraction from the interstices by an anchor plug, identified generaly in FIG. 10 by the number 50, adapted to fit down into the coacting interstices, as shown. Each anchor plug 50 comprises a generally square base 52 adapted to fit down into the coacting cluster interstice and having concave side edges 54 adapted to nestle against each of the four adjacent containers 20c, as shown in FIG. 9. Three studs 56 project upwardly from three corners of the base 52, as shown, and serve as anchors for the inner ends of the three coacting loops 38c which are placed around the studs, as shown. Preferably, the upper ends of the studs 56 are somewhat enlarged to hold the coacting loops against upward movement off the studs.

The base 52 and studs 56 of each anchor 50 are covered by an overlying disk 58, FIGS. 8 and 10, suitably secured to the base 52 and defining a central well 60 opening downwardly through a central aperture 62 in the underlying base 52. The well 60 and aperture 62 in each anchor 50 together define a finger opening designated generally in FIG. 8 by the number 64. The carrier pack formed by the containers 20c bound together by the band 22c and the anchors 50 can be conveniently carried by inserting the fingers of one hand down into the openings 64 of the anchor elements 50.

Component elements of the modified carrier pack illustrated in FIGS. 11 to 14, which are similar to elements of the carrier pack illustrated in FIG. 1 are identified by the same reference numbers, with the addition of the suffix "d."

In the carrier pack 24d of FIG. 11, six retaining band loops 38d extend inwardly between the six containers of the carrier pack, as shown, to connect with a common anchor 70, FIG. 13, which is centrally disposed with reference to the carrier pack, as indicated in FIGS. 11 and 12.

The anchor 70 comprises a common base 72 from which six anchor studs 74 extend upwardly into the inner ends of the six band loops 38d. After placement of the loops 38d around the respective anchor studs 74, the base 72 and studs 74 are covered by a comating cap 76 which is fitted down over the studs above the band loops, as shown in FIG. 13.

A handle 80 for supporting the carrier pack thus formed is fashioned from a single length of wire shaped, as shown in FIG. 15, to form a straight support shank 82 extending downwardly from a hand grip loop 84. As shown in FIG. 13, the shank 82 of the handle 80 extends down through the center of the common anchor 70. Below the base 72 of the anchor 70, the lower end of the shank 82 is bent at right angles to the main portion of the shank and shaped to form an anchor 86 which abuts against the base 72 to support the carrier pack 24d upon lifting of the pack by the handle loop 84.

It will be appreciated that the present invention is not necessarily limited to use of the specific structure illustrated, but includes the use of variants and alternatives within the spirit and scope of the invention as defined by the claims.

The invention is claimed as follows:

1. A container pack comprising, in combination, a cluster of containers disposed in two juxtaposed rows, an endless stretchable retaining band encompassing said cluster and including a plurality of inner loops extending inwardly into the cluster between adjacent containers thereof, a U-shaped handle having two horizontally spaced depending legs extending into interstices defined within said cluster in positions longitudinally spaced therealong, and said legs being interlocked with the inner ends of the adjacent loops to retain the latter against retraction from within said cluster to maintain a tight embracing relationship of said band with each container of said cluster.

2. A carrier pack of containers comprising, in combination, a cluster of six containers disposed in two juxtaposed parallel rows, a stretchable retaining band disposed in encircling relation to said cluster of containers, said retaining band including six inner loop portions thereof extending into the cluster between successive ones of the adjacent containers in the cluster, a U-shaped handle including two leg portions thereof extending into interstices within the cluster spaced apart along the length of the cluster, and each leg of said handle extending through and forming an anchor for the inner ends of three adjacent inner loops at the corresponding end of the cluster.

3. A container carrier pack comprising, in combination, an elongated cluster of generally cylindrical containers arranged in two rows, a common anchor disposed within said cluster and including a plurality of parallel anchoring studs equal in number to said containers, a stretchable carrier band encircling said cluster and defining a plurality of inner loops extending into said cluster between successive containers along the periphery of said cluster, the inner ends of said inner loops being anchored around the respective studs of said anchor, and means coacting with said anchor to retain the inner ends of said loops in anchored relation to said studs.

4. A container carrier pack comprising, in combination, an elongated cluster of containers arranged in two rows, a common anchor centrally located with respect to said cluster and including a plurality of parallel anchoring studs equal in number to said containers, a carrier band encircling said cluster and defining a plurality of inner loops extending into said cluster between successive containers along the periphery of said cluster, the inner ends of said loops being anchored around the respective studs of said anchoring means, and hand grip means on said anchor.

5. A carrier pack of containers comprising, in combination, a cluster of containers, anchoring means disposed inwardly of the periphery of said cluster and including a plurality of studs secured to a common base, a stretchable carrier band embracing said cluster and defining a plurality of inner loops extending between adjacent containers in said cluster and being anchored to said respective studs, and said anchoring means including means coacting with said studs and with the inner ends of said loops to retain the loops in anchored relation to the studs.

6. A carrier pack of containers comprising, in combination, a cluster of containers arranged in two rows, anchoring means disposed within the periphery of said cluster and including a plurality of studs secured to a common base, a carrier band embracing said cluster and defining a plurality of inner loops extending between adjacent containers in said cluster and being anchored to said respective studs, and hand grip means on said stud base.

7. The method of forming a carrier pack of containers, comprising, assemblying a cluster of generally cylindrical containers in two rows, placing a stretchable carrier band in encompassing relation to said cluster, engaging said carrier band between successive containers in the periphery of said container cluster and forcing the engaged portions of the band inwardly between the adjacent containers to form a plurality of inner loops, and anchoring the inner ends of said inner loops against retraction from between the containers to retain said carrier band in tight embracing relation to each of the containers in the cluster.

8. The method of forming a carrier pack of cylindrical containers comprising, placing a plurality of containers in two juxtaposed rows, placing an endless stretchable band in encircling relation to the cluster, moving a plurality of portions of the band spaced around the cluster horizontally inward to form inner loops extending between adjacent containers in the cluster, and inserting holding means through adjacent inner ends of the inner loops to hold the loops together against retraction from between the containers.

9. The method of forming a carrier pack of containers comprising, placing a plurality of containers in a loose cluster formed of two juxtaposed rows of containers, placing a stretchable carrier band in encircling relation to the cluster, moving a plurality of opposed portions of said band on opposite sides of said cluster inwardly with respect to the cluster and into overlapping relation to each other, and inserting anchoring means into the overlapped inner ends of the opposed portions of said carrier band to hold the band in snug embracing relation to the individual containers of the cluster.

10. The method of forming a carrier pack of containers comprising, placing a plurality of containers in a loose cluster formed of two juxtaposed rows of containers, placing a carrier band in encircling relation to the cluster, moving a plurality of spaced portions of said band inwardly to form inner loops extending between adjacent containers of said cluster, and anchoring adjacent inner ends of said loops together to hold the band in snug embracing relation to all the containers in the cluster.

11. The method of forming a carrier pack of generally cylindrical containers, comprising, placing a plurality of containers in a cluster formed of two juxtaposed rows of containers, placing an endless carrier band in encircling relation to said cluster, moving spaced portions of said carrier band inwardly between successive containers in the periphery of the cluster to form inner loops in the band extending between the adjacent containers and to effect in each of two longitudinally spaced interstices within the cluster a mutually overlapping relationship of the inner ends of the adjacent loops, and inserting a U-shaped carrying bail into assembled relationship to said inner loops so that each leg of the bail extends through the inner ends of the loops overlapping each other in said respective interstices.

12. The method of forming a carrier pack of generally cylindrical containers, comprising, arranging six containers in a cluster of two juxtaposed rows of three containers each which together define two interstices spaced apart longitudinally along the cluster, placing a stretchable carrier band in encircling relation to the cluster, moving spaced portions of the band inwardly to form at each end of the cluster three inner loops extending inwardly between adjacent containers of the cluster into overlapping relation to each other within the adjacent ones of said interstices, and inserting the two legs of a U-shaped handle into said respective interstices so that each leg extends through the three overlapped loops within the coacting interstice to anchor the loops against retraction from the interstices.

13. The method of forming a carrier pack of containers, comprising, arranging a plurality of containers in a cluster of two juxtaposed rows which together define two interstices spaced apart longitudinally along the cluster, placing a carrier band in encircling relation to the cluster, moving spaced portions of the band inwardly to form inner loops extending inwardly between adjacent containers of the cluster into adjacent relation to each other within the adjacent ones of said interstices, inserting the two legs of a U-shaped handle into said respective interstices, and anchoring each handle leg to all the inner loops extending into the interstice receiving the handle leg whereby all said containers are supported by said handle through said band.

14. A carrier pack of containers comprising, in combination, a plurality of generally cylindrical containers arranged in a cluster of two juxtaposed rows, two anchor plugs disposed in interstices between said containers at locations spaced apart longitudinally along said cluster, each of said anchor plugs having sides shaped to nestle against adjacent ones of said containers, each of said plugs including a plurality of anchor studs, a carrier band extending around said cluster and including a plurality of inner loops extending into said cluster between adjacent ones of said containers and being anchored around said anchor studs of said anchor plugs, and retainer means secured to each of said plugs to preclude dislodgment of the inner loops from the studs on the plug.

15. A carrier pack of containers comprising, in combination, a plurality of containers arranged in a cluster of two juxtaposed rows, two anchor plugs disposed in interstices between said containers at locations spaced apart longitudinally along said cluster, each of said anchor plugs having four sides shaped to nestle against four adjacent ones of said containers, a carrier band extending around said cluster and including a plurality of inner loops extending into said cluster between adjacent ones of said containers and connecting to said anchor plugs, and carrier pack support means associated with said anchor plugs.

16. A carrier pack of containers comprising, in combination, six generally cylindrical containers arranged in a cluster of two juxtaposed rows of three containers each, two anchor plugs disposed in interstices between said containers at locations spaced apart longitudinally along said cluster, each of said anchor plugs having four concave sides adapted to nestle against four adjacent ones of said containers, a carrier band extending around said cluster and including a plurality of inner loops extending into said cluster between adjacent ones of said containers and connecting to adjacent ones of said anchor plugs, and each of said anchor plugs defining a finger opening therein.

17. A carrier pack of containers comprising, in combination, a cluster of containers arranged in two rows, anchoring means disposed within said cluster in inwardly spaced relation to the periphery thereof, an elastic carrier band encircling said cluster and including a plurality of inner loops extending inwardly between adjacent containers in said cluster, each of said inner loops being looped around a portion of said anchoring means to anchor the loop to the anchoring means, and hand holding means on said anchoring means.

18. A carrier pack of containers comprising, in combination, a cluster of containers arranged in two rows, anchoring means disposed within said cluster, a freely flexible tension element extending around containers in said cluster and including a plurality of inner loops extending inwardly between adjacent containers in said cluster, adjacent ones of said loops being connected together by intervening portions of said tension element integral with said loops and extending around the outer portions of the adjacent containers, and said inner loops each being looped around a portion of said anchoring means to anchor the individual loops to the anchoring means to effect by tension in the tension element holding of the tension element in close contact with outer portions of the containers with respect to said anchoring means to hold the containers together in the cluster.

19. A carrier pack of containers, comprising, in combination; a plurality of containers disposed in a cluster having, with reference to normal upright positions of the containers, a horizontal periphery overall; discrete anchoring means disposed, with respect to the cluster, inwardly from said cluster periphery; a somewhat elastic and freely flexible tension element forming a plurality of freely flexible loops each of which has two inner portions both anchored to said discrete anchoring means, said loops extending from said anchoring means outwardly between containers of said cluster and being looped around adjacent containers, said loops being dimensioned with respect to the containers and the anchoring means to obviate slack in the loops whereby tension in the freely flexible loops holds the loops in engagement with the adjacent containers and supports the containers in the cluster, and hand holding means on said anchoring means.

20. A carrier pack of containers comprising, in combination, a cluster of containers arranged in two rows, discrete anchoring means disposed within said cluster, a freely flexible tension element encircling said cluster, said tension element including as component portions thereof a plurality of inner loops extending inwardly between adjacent containers in said cluster and being anchored to said discrete anchoring means, said tension element including as component portions thereof a plurality of outer loops which respectively connect successively adjacent ones of said inner loops and extend around outer portions of adjacent containers with respect to the anchoring means, and said inner and outer loops being dimensioned to produce in the inner and outer loops tension which holds the outer loops in snug engagement with the containers to hold the containers together in the cluster.

21. A carrier pack of containers, comprising, in combination; a plurality of containers disposed in a cluster having, with reference to normal upright positions of the containers, a horizontal periphery overall; discrete anchoring means disposed, with respect to the cluster, inwardly from said cluster periphery; a plurality of freely flexible loops each of which has two inner portions anchored to said anchoring means, said loops extending from said discrete anchoring means outwardly between containers of said cluster and being looped around adjacent containers, and said loops being dimensioned with respect to the containers and the anchoring means to obviate slack in the loops whereby tension in the freely flexible loops holds the loops in engagement with the containers around which the loops are looped to hold the containers in the cluster.

References Cited in the file of this patent

UNITED STATES PATENTS

| | | |
|---|---|---|
| 1,343,991 | Aikman | June 22, 1920 |
| 2,409,750 | Frear | Oct. 22, 1946 |
| 2,559,060 | Zenick | July 3, 1951 |
| 2,740,657 | Poupitch | Apr. 3, 1956 |
| 2,874,835 | Poupitch | Feb. 24, 1959 |
| 2,891,664 | Goyert | June 23, 1959 |
| 2,994,426 | Biesecker et al. | Aug. 1, 1961 |
| 3,028,189 | Gialanella | Apr. 3, 1962 |

FOREIGN PATENTS

| | | |
|---|---|---|
| 128,654 | Sweden | June 27, 1950 |